(12) United States Patent
Swersky

(10) Patent No.: US 6,257,653 B1
(45) Date of Patent: Jul. 10, 2001

(54) WIND BAFFLE ATTACHABLE TO SEATS USING STRAPS

(76) Inventor: Robert B. Swersky, 1201 Northern Blvd., Manhasset, NY (US) 11030

( * ) Notice: Subject to any disclaimer, the term of this patent is extended or adjusted under 35 U.S.C. 154(b) by 0 days.

(21) Appl. No.: 09/621,115

(22) Filed: Jul. 21, 2000

Related U.S. Application Data

(63) Continuation-in-part of application No. 09/491,311, filed on Jan. 25, 2000, now Pat. No. 6,193,298.

(51) Int. Cl.$^7$ ..................................................... B62D 35/00
(52) U.S. Cl. ........................................... 296/180.1; 296/85
(58) Field of Search .................................. 296/180.1, 85

(56) References Cited

U.S. PATENT DOCUMENTS

| | | | |
|---|---|---|---|
| 3,002,784 | * | 10/1961 | Bagg . |
| 4,850,637 | * | 7/1989 | Carlino ............................... 296/180.1 |
| 5,707,099 | * | 1/1998 | Schrader et al. .................. 296/180.1 |
| 5,791,725 | * | 8/1998 | Swersky ............................. 296/180.1 |

* cited by examiner

Primary Examiner—Joseph D. Pape
(74) Attorney, Agent, or Firm—Collard & Roe, P.C.

(57) ABSTRACT

A wind baffle for convertible automobiles including a baffle sheet and straps for affixing the baffle sheet to the front seats of the convertible automobile. Support legs provide further stability to the baffle sheet so that it is held in place behind the front seat compartment. The support legs angle the baffle sheet to reduce glare and reflections off the sheet. The wind baffle prevents wind currents from passing from the rear of the convertible automobile to the front seat compartment.

12 Claims, 2 Drawing Sheets

WIND BAFFLE ATTACHABLE TO SEATS USING STRAPS

This is a Continuation-in-part of U.S. patent application Ser. No. 09/491,311 filed on Jan. 25, 2000, now U.S. Pat. No. 6,193,298.

BACKGROUND OF THE INVENTION

1. Field of the Invention

The present invention relates to wind baffles for convertible automobiles.

2. Prior Art

The present invention relates to a wind baffle which is removably installed behind the front seats of a convertible automobile. The baffle is adjustable for different heights of the seats and is adjustable to different angles to eliminate glare.

A problem that has existed since the introduction of convertible automobiles has been that, as the automobile moves forward, air flows over the windshield and heads of the occupants of the front seat area, thus producing a lower air pressure zone in the front seat area. Consequently, reverse air currents travel between the front seats and headrests, producing turbulence. These reverse air currents can have a number of negative effects on the occupants' driving experience. For example, the hair styles of the occupants are disturbed; the occupants experience difficulty in carrying on a normal conversation; the occupants are chilled on cool days; the occupants' belongings are blown around the front seat area and possibly blown from the front seat compartment of the automobile; and wind roar makes conversation or listening to music quite difficult.

Various attempts have been made to solve the aforementioned problems. For example, U.S. Pat. No. 5,024,481, shows a sheet of rigid, transparent material mounted behind the front seat compartment via an adjustable horizontal rod having ends attachable to the respective inner side body surfaces of the automobile in order to prevent wind currents from passing from the rear of the automobile into the front seat compartment.

In addition, U.S. Pat. No. 5,791,725, shows a substantially vertical rod attached to the above arrangement having one end attachable to the sheet and the other end attachable to the floor or back seat of the automobile in order to further stabilize the sheet while the car is in motion. This vertical rod is adjustable in length in order to make the wind baffle compatible with cars having differing seat heights.

Moreover, U.S. Pat. No. 4,850,637, shows a baffle sheet that is removably attachable to the bucket seats or a bench seat of a convertible automobile utilizing straps such as belts for wrapping around a portion of the bucket or bench seats of the automobile. To provide further support during use, the baffle sheet extends downward to the automobile floor and is either permanently or temporarily affixed to the floor of the automobile.

The devices described above, however, have several disadvantages. For example, as the reverse air currents contact the rigid sheet of the first device, the sheet is caused to rotate around the horizontal rod attached to the sheet. As such, the upper portion of the sheet becomes pressed against the headrests of the front seats thereby bothering the occupants of the car. Another disadvantage is that the sheet must be custom-made to fit a specific car. That is, the sheet must to be cut so that the top of the sheet reaches a desired point.

A disadvantage of the second device is that, in view of the multiple parts needed to construct the device, it is costly to manufacture. Moreover, the multiple parts cause the device to be relatively heavy and therefore difficult to maneuver and install.

A disadvantage of the third device is that, since the baffle sheet extends downward to the automobile floor, it is non-adjustable in the vertical direction and therefore cannot be adjusted to be compatible with cars having varying seat heights. Further, as the sheet is typically formed from a transparent plastic material, a glare is often created at night by the lights from the dashboard. However, since the strip is not adjustable and is permanently fixed to the floor of the automobile, the sheet cannot be tilted to eliminate such glare.

SUMMARY OF THE INVENTION

It is therefore an object of the present invention to provide a wind baffle that prevents wind currents from passing from the rear of a convertible automobile between the front seats and headrests into the front seat compartment. It is another object to provide a baffled sheet having an adjustable height. It is a further object to have a baffle sheet that is prevented from pivoting around its horizontal axis.

It is a further object of the invention to provide a wind baffle that is inexpensive to manufacture and simple to install.

These and other objects of the present invention, which will become apparent from the following description, are achieved by the wind baffle of the present invention which comprises a baffle sheet and means for affixing the baffle sheet in place behind the front seats of the convertible automobile to prevent wind currents from passing from the rear of the convertible automobile to the front seat compartment. The affixing means include at least one strap that is attachable to the baffle sheet and to either a portion of at least one of the front seats or to a roll bar of the convertible automobile. In addition, horizontal support legs are attached to the baffle sheet so that it rests firmly against the back of the front seats.

In a preferred embodiment, the affixing means includes two straps that are inserted through apertures in the baffle sheet. The straps are then wrapped around the bar attaching the headrests to the front seats of the convertible automobile. However, in other embodiments of the invention, the straps are wrapped around the headrests of the front seats or to a roll bar of the convertible automobile.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
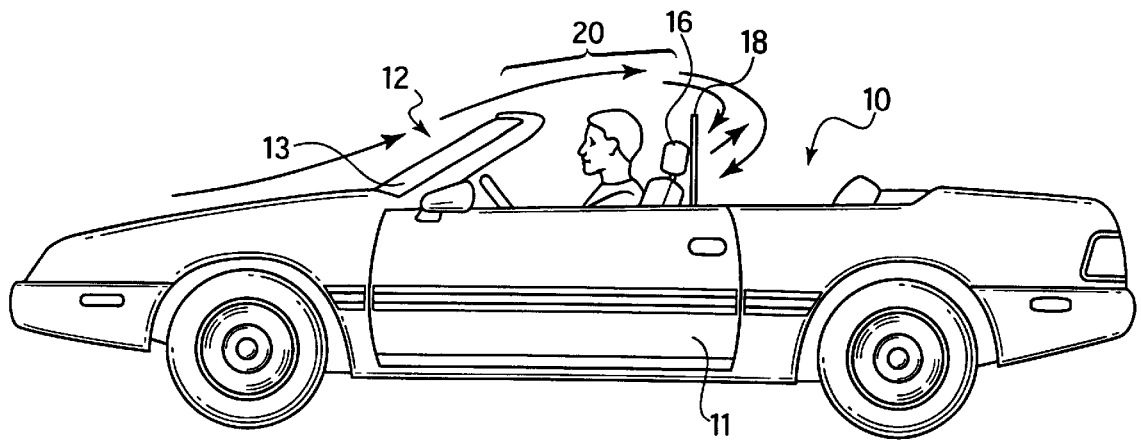
FIG. 1 is a side view of a convertible automobile having a wind baffle in accordance with the present invention mounted therein.

Referring now in detail to the drawings and, in particular, FIG. 1 there is shown a convertible automobile generally designated 10 having opposite side doors 11, a windshield assembly 12 comprising a windshield 13, and front seats 16, all of which form the front seat passenger compartment 20. When the automobile is moving in a forward direction, wind currents are deflected over the windshield 13 and are caused to flow over the front seat passenger compartment 20, thus creating a lower air pressure zone therein. Wind baffle 18 rests behind front seats 16.

Figure 2:
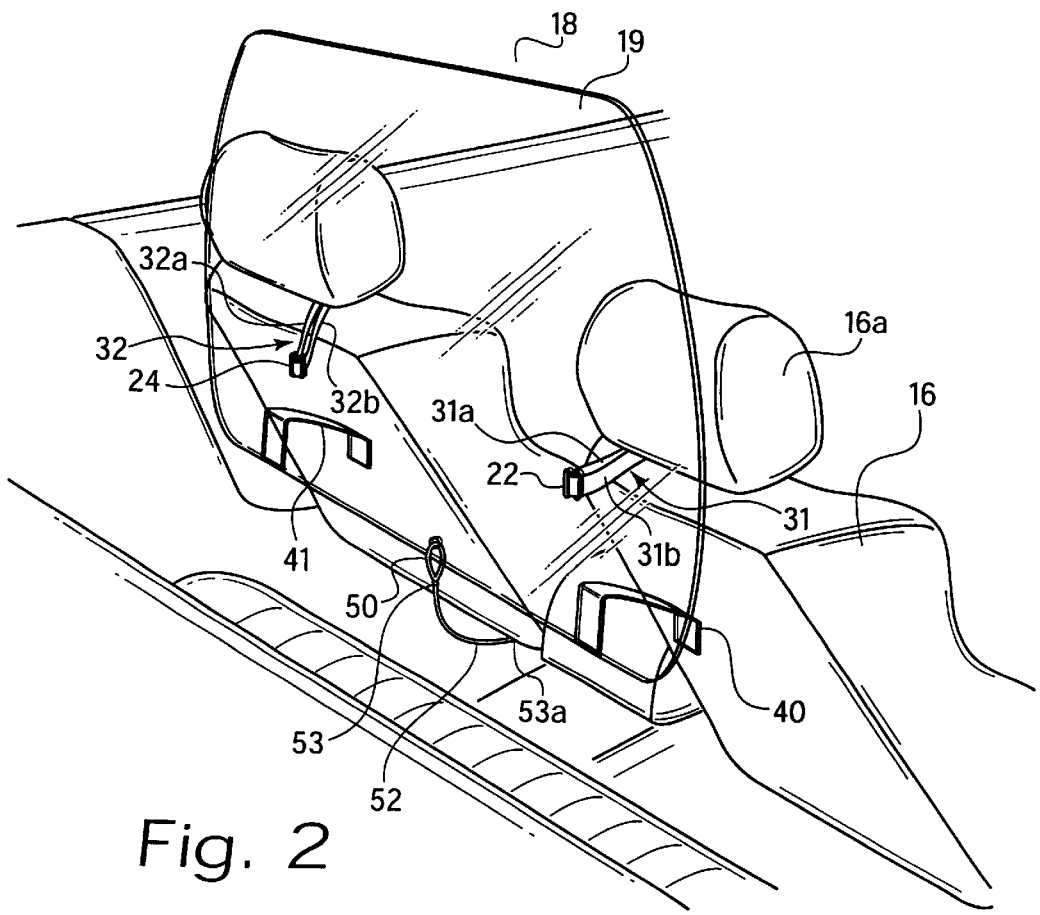
FIG. 2 shows a back perspective view of the baffle sheet attached to the front seats.
Figure 3:
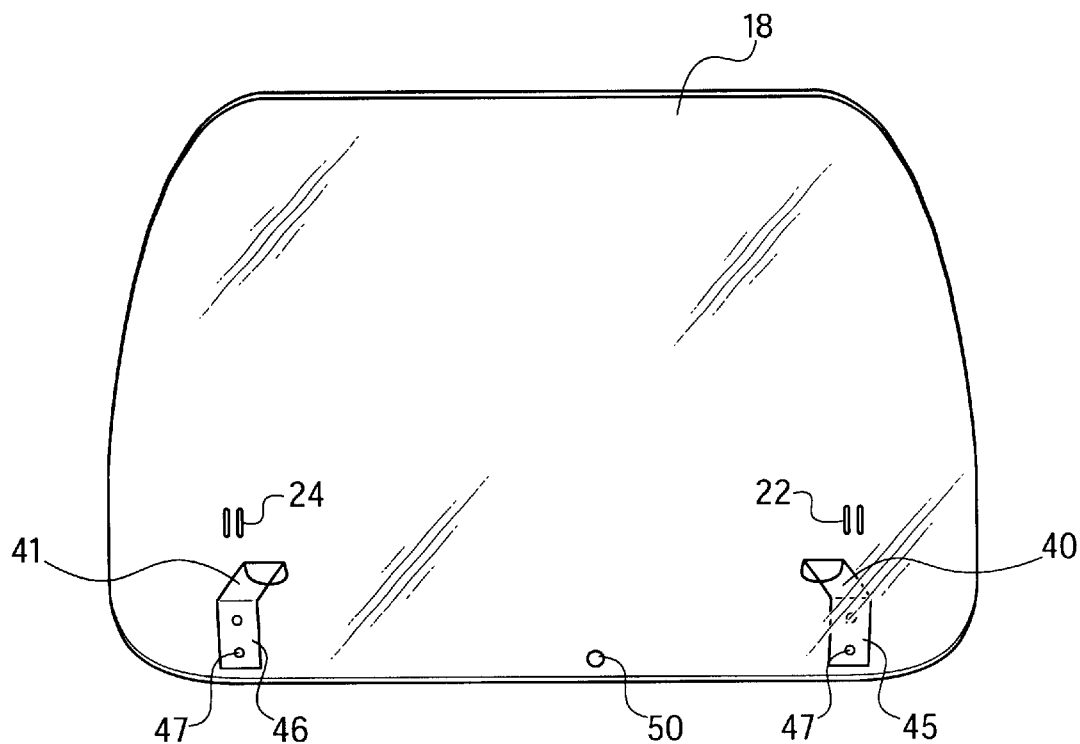
FIG. 3 is a front view of the baffle sheet.
Figure 4:
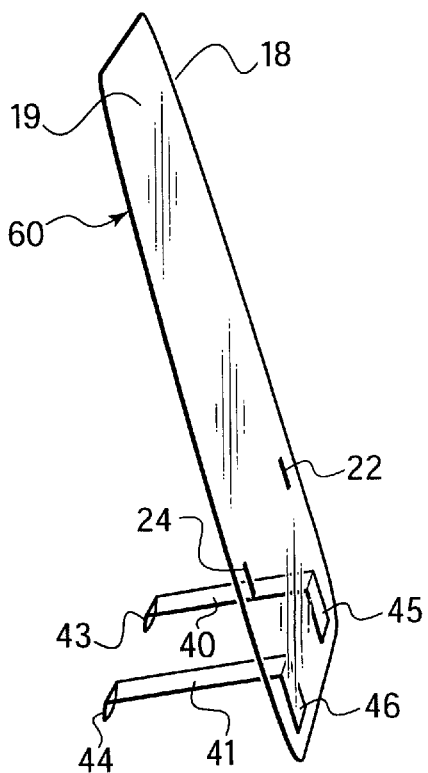
FIG. 4 is side perspective view of the baffle sheet.

As shown in FIGS. 2–4, the wind baffle 18 comprises a plastic baffle sheet 19. Two pairs of slots 22 and 24 are formed in the baffle sheet 19, each pair of slots being formed on a respective side portion of the baffle sheet. Support legs 40, 41 are provided to stabilize baffle sheet 19. As shown in FIG. 1, the wind baffle 18 prevents reverse air currents from traveling from the rear of the car between front seats 16 and headrests 16*a*, thus preventing turbulence within the front seat passenger compartment 20.

In a preferred embodiment of the invention, the width of baffle sheet 19 extends between the approximate centers of the respective front seat headrests 16*a*. Such an arrangement yields the advantageous features of making it convenient for a person in the front seat to place items such as packages on a shelf or seat in the rear compartment and enables sound originating in the rear compartment, e.g. from a stereophonic speaker, to be easily heard in the front seat compartment. Using a wider sheet, e.g., a sheet which extends beyond the outer edges of the seats, would diminish or eliminate these advantages while the use of a narrower sheet leads to a greater, perhaps unacceptable, level of turbulence in the front seat compartment. As such, baffle sheet 19 is formed to have a width of about 20 inches to about 40 inches, preferably 30 inches, and a height of about 10 inches to about 30 inches, preferably 20 inches.

The baffle sheet 19 is preferably formed from a transparent plastic material but can also be tinted in order to reduce glare or for aesthetic purposes. In addition, the baffle sheet 19 can be formed from a mesh material in order to eliminate glare altogether. However, forming the baffle sheet from mesh allows a moderate amount of wind to penetrate the sheet, thereby reducing the effectiveness of the invention.

As shown in FIG. 2, baffle sheet 19 is affixed to the back sides of front seats 16 through the use of straps 31, 32. These straps are preferably straps of one wrap VELCRO® or other hook-and-loop type fastener being about 1 inch wide and 18 inches long. In this manner, hooks are arranged on one entire side of each strap and loops are arranged on the other entire side of each strap such that each strap can be formed into a continuous loop by fastening the "hook" side of one end of a strap to the "loop" side of the other end of the strap. The measurements of these straps can be varied as long as the straps are long enough to be wrapped around a portion of the front seats of the automobile and as long as the straps are of a sufficient width to be strong yet able to fit within the slots of the baffle sheet.

It should be recognized that, rather than straps of one wrap VELCRO®, for use in connection with this invention, a conventional belt and belt buckle, an elastic strap, or other similar means may also be employed for encircling portions of the front seats.

In order to affix the baffle sheet 19 to the front seats 16, which will be discussed in further detail below in connection with the method for installing the wind baffle 18, a first end 31*a*, 32*a* of each of the straps 31, 32 is fed through slots 22, 24 respectively, as shown in FIG. 2. The first ends of the straps are then wrapped around a portion of each headrest 16*a*. In the embodiment shown, the straps are wrapped around the bars of the headrests which attach the headrests to the seats. Lastly, the first end of each strap is fastened to the second end 31*b*, 32*b* of each strap in a snug manner to thereby secure baffle sheet 19 to the front seats.

Support legs 40, 41 are positioned at the bottom of baffle sheet 19 and extend perpendicularly from front surface 60, towards front seats 16. Support legs 40, 41 contain feet 43, 44 that are perpendicularly attached thereto. Feet 43, 44 maintain baffle sheet 19 firmly pressed against front seats 16. When wind passes over baffle sheet 19, support legs 40, 41 prevent baffle sheet 19 from dislodging form the front seats. Support legs 40, 41 angle baffle sheet 19 to reduce glare and reflections off the sheet. As shown in FIGS. 3 and 4, mounting brackets 45, 46 are provided for attaching support legs 40, 41 to baffle sheet 19. Mounting brackets 45, 46 are integrally formed with support legs 40, 41, preferably made from a molded plastic material. Screws 47 attach mounting brackets 45, 46 to baffle sheet 19, however other attaching devices could be used.

An additional aperture 50 is provided at the bottom of baffle sheet 19. Aperture 50 allows for safety cord 52 to be attached to baffle sheet 19. Safety cord 52 connects baffle sheet 19 to the underside of front seats 16 or to a roll bar. Attaching safety cord 52 to a portion of the convertible automobile prevents baffle sheet 19 from exiting the car in the event of an accident. Safety cord 52 is of a length that permits it to be attached to the under portion of front seats 16 or the roll bar. Safety cord 52 is equipped with a lockable connecting mechanism 53, 53*a* at either end.

Pairs of slots 22 and 24 are formed in the baffle sheet such that they align with the location of typical seats in a convertible automobile. The slots are formed in a vertical manner substantially parallel to one another. However, in another embodiment of the invention discussed further below, the slots can be formed in a horizontal manner.

As stated above, in the preferred embodiment of the invention, the straps are affixed to the sheet via the slots formed in the sheet. Alternatively, in another embodiment, the straps are permanently affixed to the sheet (not shown). However, the former embodiment is preferred since the VELCRO® formed on the straps can "wear out" and providing removable straps allows the straps to be easily replaced, if necessary.

Once baffle sheet 19 is positioned in the desired location, a first end of each of straps 31, 32, which were previously inserted through slots 22 and 24, is wrapped around a portion of front seats 16. The straps can be wrapped around either the headrest, the bar connecting the headrest to the seat, or the roll bar (if included).

The method of securing the straps to the front seats is dictated predominantly by the construction of the particular seat. It is preferred that the straps be secured to either the bars connecting the headrest to the seat or to the roll bar in order to minimize any contact the straps may have with the heads of the occupants of the automobile. However, if necessary, the straps can be secured around the headrests themselves. If the slots of the baffle sheet are formed in a vertical manner, then the straps will be wrapped around the width of the headrests. However, if the slots are formed in a horizontal manner, the straps will be wrapped around the height of the headrests.

Accordingly, while only a few embodiments of the present invention have been shown and described, it is obvious that many changes and modifications may be made thereunto without departing from the spirit and scope of the invention.

What is claimed:

1. A wind baffle assembly for convertible automobiles having front seats having backs, comprising:
   a baffle sheet comprising a top edge, a bottom edge, two side edges and a front and back surface;
   at least one set of apertures for affixing said baffle sheet in place behind the front seats of the convertible automobile;
   at least one strap attachable to said baffle sheet, through said at least one set of apertures, and to a portion of at least one of the front seats; and
   at least two flexible support legs attached perpendicularly to said front surface of the baffle sheet near said bottom edge of the baffle sheet, wherein said at least two flexible support legs rest against the backs of the front seats and maintain said baffle sheet in an upright position during use.

2. The wind baffle assembly according to claim 1, further comprising an additional aperture at said bottom edge of said baffle sheet disposed between said at least two support legs.

3. The wind baffle assembly according to claim 2, further comprising a safety cord that attaches through said additional aperture, to prevent said wind baffle from exiting the automobile in the event of an accident.

4. The wind baffle assembly according to claim 3, wherein said safety cord comprises a first lockable connecting mechanism for attaching said safety cord to said aperture of said baffle sheet.

5. The wind baffle assembly according to claim 3, wherein said safety cord further comprises a second lockable connecting mechanism for attaching said safety cord to a lower portion of the front seats or to a roll bar.

6. The wind baffle assembly according to claim 1, wherein said at least one strap comprises a first end and a second end and means for connecting said first end to said second end.

7. The wind baffle assembly according to claim 1, wherein said set of apertures are vertically oriented and substantially parallel to one another.

8. The wind baffle assembly according to claim 1, wherein said at least two flexible support legs each comprise a foot extending substantially parallel to said baffle sheet and located at a free end of each of said support legs.

9. The wind baffle assembly according to claim 1, wherein said support legs are formed from molded plastic.

10. The wind baffle assembly according to claim 1, wherein said support legs further comprise a mounting bracket located adjacent and parallel to said baffle sheet, so that said mounting bracket attaches said support legs to said baffle sheet.

11. The wind baffle assembly according to claim 10, wherein said mounting bracket is integrally formed with said support legs.

12. The wind baffle assembly according to claim 11, wherein said mounting bracket is attached to said baffle sheet via screws.

* * * * *